United States Patent [19]
Puchosic

[11] Patent Number: 6,045,295
[45] Date of Patent: Apr. 4, 2000

[54] HOOK MECHANISM FOR A COMPACTING MACHINE

[75] Inventor: John E. Puchosic, Naperville, Ill.

[73] Assignee: Caterpillar Inc., Peoria, Ill.

[21] Appl. No.: 09/213,684

[22] Filed: Dec. 17, 1998

[51] Int. Cl.[7] .............................. E01C 19/23; B60S 1/68; B62D 25/18
[52] U.S. Cl. .................... 404/128; 404/122; 404/129; 280/156; 280/855; 305/115
[58] Field of Search ....................... 280/156, 157, 280/855; 404/122, 128, 129; 305/115, 100

[56] References Cited

U.S. PATENT DOCUMENTS

| | | | |
|---|---|---|---|
| 1,675,032 | 6/1928 | Lamont | 305/100 |
| 3,127,190 | 3/1964 | Thesmar | 305/100 |
| 4,818,040 | 4/1989 | Mezzancella et al. | 305/100 |
| 5,967,630 | 10/1999 | Sewell | 305/110 |
| 5,975,548 | 11/1999 | Galli et al. | 280/157 |

*Primary Examiner*—Eileen Dunn Lillis
*Assistant Examiner*—Gary Hartmann
*Attorney, Agent, or Firm*—Dave M. Masterson

[57] ABSTRACT

In the operation of a landfill compactor, it is a common problem for the wheels to pick up debris, especially wire and cable, and carry it around with the wheels as they rotate. When the debris falls from the wheels in the direction toward the frame and the axles, it becomes packed between the frame and the axle hampering machine operation and requiring hours of corrective maintenance. The apparatus of the subject invention for inhibiting the wrapping of debris about the axle assembly provides a hook member to ensnare debris. As the wheel rotates, the debris picked up by the hook member is dragged across a serrated blade portion mounted on the axle assembly to pull apart the debris and thus prevent the debris from wrapping around the axle assembly.

9 Claims, 2 Drawing Sheets

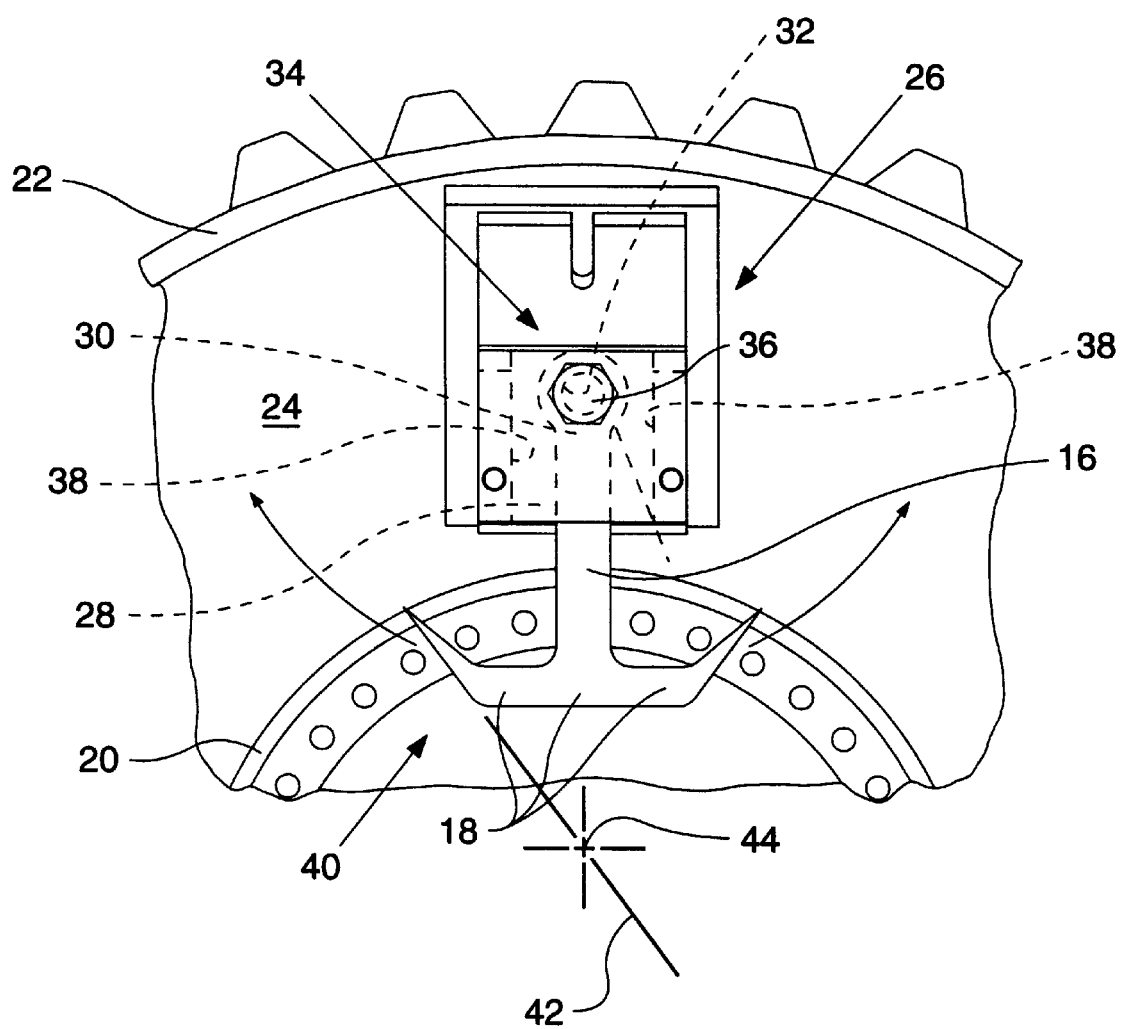

HOOK MECHANISM FOR A COMPACTING MACHINE

TECHNICAL FIELD

This invention relates generally to a hook mechanism and more particularly to a hook mechanism for use on a landfill compacting machine.

BACKGROUND ART

In the operation of modern day landfills, it is imperative to obtain maximum compaction of the material deposited in the landfills to utilize their available capacity to its fullest extent. To that end, a relatively specialized machine has been developed to break up and compress the refuse and is commonly known as a landfill compactor. The typical landfill compactor has specialized wheels that have a plurality of individual teeth that extend radially from a cylindrical drum. The teeth are separated from one another to localize the pressure exerted by the weight of the machine on the ends of the respective teeth. In doing so, more pressure is applied to the material underfoot to thereby increase the amount of compactive force applied by the machine.

The configuration of compactor wheels is varied. Most wheel configurations have a plurality of teeth that are positioned in axially spaced rows that are evenly distributed across the width of the cylindrical drum defined by the wheel. The teeth of one axially spaced row are circumferentially offset from the next so as to stagger the circumferential spacing about the drum. In many instances, the teeth are substantially truncated and end in a slight taper or point. This type of tooth is generally known as a "sheepsfoot" tooth and is intended primarily for compressing the material underfoot as much as possible as the machine makes several passes over the fill area. While this type of wheel has been known to work very well for its intended purpose, the nature of the environment in which they operate provides very difficult obstacles to the operation of the machine.

One such obstacle that is particularly prevalent is the tendency for the wheel assembly to catch material on the teeth and entrain it about the adjacent axle assembly as the machine traverses the landfill. Wire which is very often disposed of in landfills is a particular problem. Typically the inner row of teeth, particularly on a sheepsfoot wheel, will snag the wire and carry it around the axle. As the movement of the machine continues, the wire will at some point in time become entrained about the axle, trapping all kinds of other debris, which will eventually become packed into all the areas in and around the frame and the axle of the machine. Not only does this packing of material interfere with the proper operation of the machine, in some cases preventing proper axle oscillation, it also creates tremendous wear to the structure of the wheel assemblies. This situation can only be alleviated by removing the machine to a work area, removing the wheel assemblies, cutting the wire and debris away with a torch and manually removing the debris from the axle and frame. This is not only a costly, labor intensive exercise, but the machine is taken out of production while this maintenance is performed. Ultimately, this greatly increases cost and inefficiency of the overall landfill operation.

In order to alleviate this problem, several different cutting devices have been added to the axle and/or wheel assembly to cut the debris as the wheel rotates. While some cutting devices have been known to work in some applications, their efficiency is highly variable, requiring periodic debris removal maintenance anyway. Additionally, some of the various cutting devices require a multitude of additional components which increases the overall cost of the machine.

The present invention is directed to overcoming one or more of the problems as set forth above.

DISCLOSURE OF THE INVENTION

In the present invention, an apparatus for inhibiting the wrapping of debris about an axle assembly mounted on a construction machine is disclosed. A wheel is mounted on the axle assembly for rotation with respect thereto. A hook member, having at least one tine member, extends from the wheel to a location substantially adjacent the axle assembly. The tine member is operative to ensnare and remove debris from a position about the axle assembly as the wheel rotates with respect thereto.

BRIEF DESCRIPTION OF THE DRAWINGS

FIG. 2 is a diagrammatic partial elevation view of the wheel of FIG. 1 showing the hook mechanism.

BEST MODE FOR CARRYING OUT THE INVENTION

Figure 1:
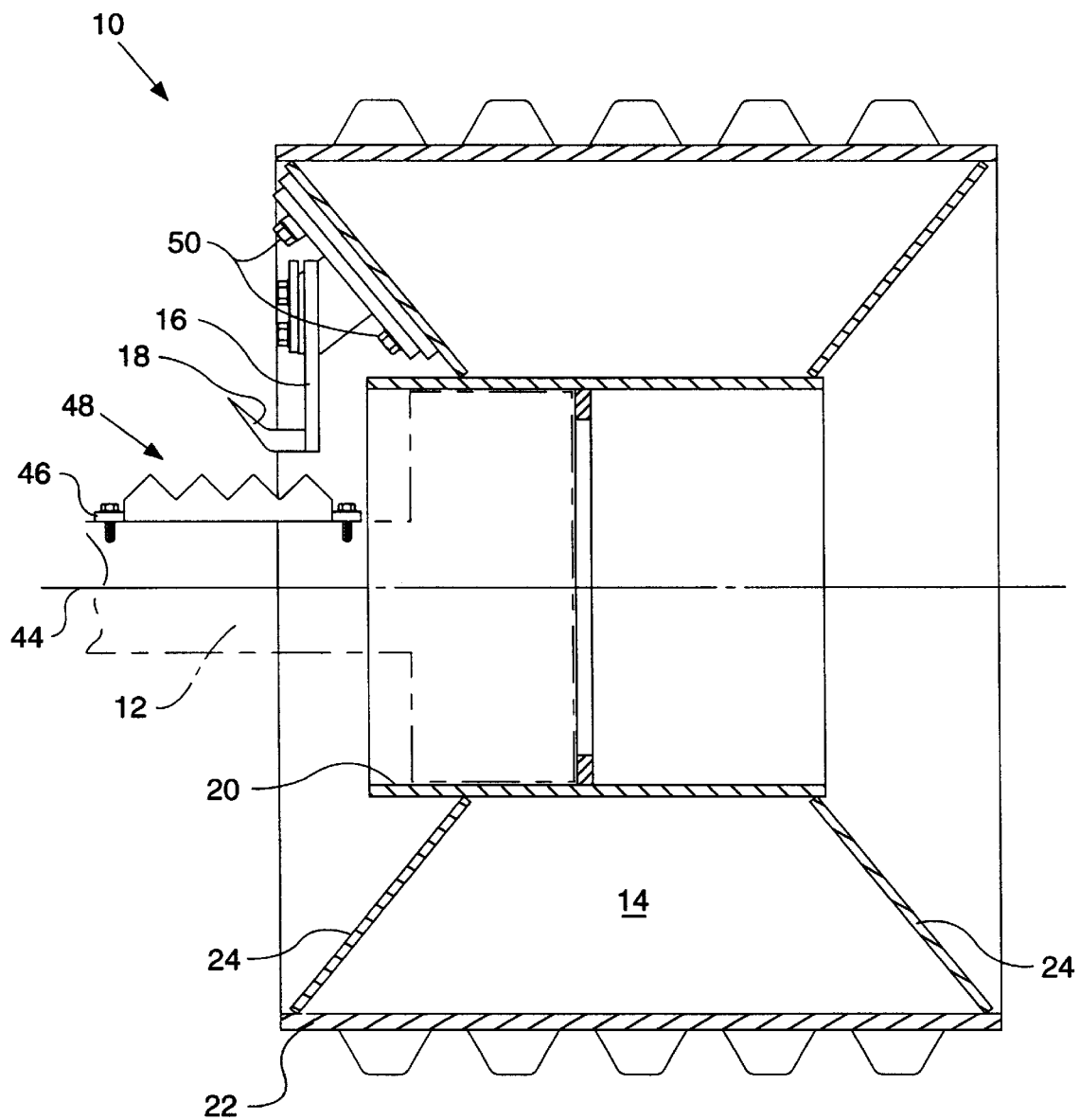
FIG. 1 is a diagrammatic section view of a portion of a compacting machine showing the compacting wheel, the axle and the hook mechanism that embodies the principles of the present invention.

Referring to the drawings, an apparatus 10 for inhibiting the wrapping of debris about an axle assembly 12 mounted on a construction machine (not shown) includes a wheel 14 mounted on the axle assembly 12 for rotation with respect thereto. A hook member 16, having at least one tine member 18, is mounted on the wheel 14. The hook member 16 extends from the wheel 14 to a location substantially adjacent the axle assembly 12. The tine member 18 is operative to ensnare debris from a position about the axle assembly 12 as the wheel 14 rotates with respect thereto.

The wheel 14 has an inner drum member 20, an outer drum member 22, and a pair of side walls 24 positioned therebetween. A bracket assembly 26 has a receptacle 28 defined therein. The bracket assembly 26 is mounted to one of the side walls 24 defined by the wheel 14.

The hook member 16 defines a shank 30 having a bore 32 formed in an end portion 34 of the shank 30. The shank 30 is adapted for positioning within the receptacle 28 defined by the bracket assembly 26. A bolt member 36 is positioned within the bore 32 defined by the shank 30. The bolt member 36 is threadably engaged with the bracket assembly 26 to mount the hook member 16 to the bracket assembly 26 for relative rotation with respect thereto.

The receptacle 28 defined by the bracket assembly 26 defines a pair of walls 38 on opposing sides thereof. The walls 38 are operative to engage the shank 30 of the hook member 16 to limit the rotation of the hook member 16 with respect to the bracket assembly 26.

Preferably, the hook member 16 defines a plurality of tines 18 on a second end portion 40 thereof. At least two of the tines 18 are positioned in a reference plane 42 substantially perpendicular to an axis 44 about which the wheel 14 rotates and the third tine 18 is substantially perpendicular to the axis 44.

A second bracket member 46 is mounted on the axle assembly 12 and is positioned in alignment with a path of rotation defined by the hook member 16 as it rotates about the axle assembly 12. The second bracket member 46 defines a serrated blade portion 48 that acts in conjunction with the hook member 16 to sever debris that is ensnared by the hook member 16 and pulled against the blade portion 48 during rotation of the wheel 14. The bracket assembly 26 is secured to the side wall 24 of the wheel 14 by a plurality of bolts 50. The bolts are operative to shear upon application of a predetermined force.

Industrial Applicability

As previously stated, when a compacting machine is operating in an environment such as a landfill, it will be traversing over terrain that is by nature littered with all sorts of debris. As the teeth of the compacting wheels compress the debris, they often penetrate the various articles and tend to carry them around the wheel as they rotate. Additionally, debris such as cable, wire, banding straps and other stringy material tend to wrap about the axle along with other debris.

In operation, the apparatus 10 for inhibiting the wrapping of debris about the axle assembly 12 of a construction machine utilizes the hook member 16 to ensnare the debris such as cable, wire, and banding straps. As the wheel 14 rotates about its axis 44, relative to the axle assembly 12, the tine members 18 of the hook member 16 snag the debris. With continued rotation of the wheel 14, the snagged debris is dragged across the serrated blade portion 48 of the second bracket member 46. The relative interaction between the rotating hook member 16 and the stationary blade portion 48 mounted on the axle assembly 12, causes the debris to be pulled apart thus minimizing the occurrence of debris wrapping about the axle assembly 12.

As the wheel 14 rotates, the hook member 16 swings through an arc to better allow the tine members 18 to snag debris. The arc swing of the hook member 16 is limited by the walls 38 of the bracket assembly 26 to prevent the hook member 16 from swinging into the ground where it could be crushed. The bolts 50 that mount the bracket assembly 26 to the side wall 24 of the wheel 14 are shear bolts which fail at a predetermined load to prevent overload of the axle assembly 12.

With the apparatus 10 as set forth above, a machine is allowed to operate in such an environment and greatly reduce, if not eliminate, the packing of debris in the area around the axle assembly and the machine frame. In doing so, the amount of maintenance previously required to keep this area free of debris, which is a manual, highly labor intensive function, is also reduced or eliminated. This ultimately provides a very substantial reduction in the cost of machine maintenance. At the same time, the machine, through reduced downtime, will be kept in operation thus increasing its operational efficiency and productivity and ultimately, the overall profitability of the landfill operation.

I claim:

1. An apparatus for inhibiting the wrapping of debris about an axle assembly mounted on a construction machine, comprising:
    a wheel mounted on the axle assembly for rotation with respect thereto; and
    a hook member mounted on the wheel, the hook member having at least one tine member that extends from the wheel to a location substantially adjacent the axle assembly, the tine member being operative to ensnare and remove debris from a position about the axle assembly as the wheel rotates with respect thereto.

2. The apparatus, as set forth in claim 1, wherein the wheel has an inner and outer drum member and a pair of side walls positioned therebetween.

3. The apparatus, as set forth in claim 2, including a bracket assembly having a receptacle defined therein and being mounted to one of the side walls defined by the wheel.

4. The apparatus, as set forth in claim 3, wherein the hook member defines a shank having a bore formed in an end portion of the shank, the shank being adapted for positioning within the receptacle defined by the bracket assembly.

5. The apparatus, as set forth in claim 4, wherein a bolt member is positioned within the bore defined by the shank and is threadably engaged with the bracket assembly to mount the hook member to the bracket assembly for relative rotation with respect thereto.

6. The apparatus as set forth in claim 5, wherein the receptacle defined by the bracket assembly defines a pair of walls on opposing sides thereof, said walls being operative to engage the shank of the hook member to limit the rotation of the hook member with respect to the bracket assembly.

7. The apparatus, as set forth in claim 3, wherein the bracket assembly is secured to the side wall of the wheel by a plurality of bolts, the bolts being operative to shear upon application of a predetermined force.

8. The apparatus, as set forth in claim 1, wherein the hook member defines a plurality of tines on a second end portion thereof, at least two tines being positioned in a reference plane substantially perpendicular to an axis about which the wheel rotates and a third tine that is substantially perpendicular to said axis.

9. The apparatus, as set forth in claim 1, wherein a second bracket member is mounted on the axle assembly, the second bracket assembly being positioned in alignment with a path of rotation defined by the hook member as it rotates about the axle assembly, the second bracket member defining a blade portion that acts in conjunction with the hook member to sever debris that is ensnared by the hook member and pulled against the blade portion during rotation of the wheel.

* * * * *